US 8,733,483 B2

(12) United States Patent
Yamamoto et al.

(10) Patent No.: US 8,733,483 B2
(45) Date of Patent: May 27, 2014

(54) IN-WHEEL MOTOR DRIVE ASSEMBLY

(75) Inventors: Ken Yamamoto, Iwata (JP); Minoru Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/511,227

(22) PCT Filed: Oct. 28, 2010

(86) PCT No.: PCT/JP2010/069169
§ 371 (c)(1),
(2), (4) Date: May 22, 2012

(87) PCT Pub. No.: WO2011/065179
PCT Pub. Date: Jun. 3, 2011

(65) Prior Publication Data
US 2012/0235462 A1    Sep. 20, 2012

(30) Foreign Application Priority Data

Nov. 27, 2009  (JP) .................................. 2009-269658

(51) Int. Cl.
B60K 7/00    (2006.01)
(52) U.S. Cl.
USPC ..................................... 180/65.51; 180/65.6
(58) Field of Classification Search
USPC ......... 180/65.51, 65.6; 301/6.1, 6.5; 475/162, 475/178; 903/909, 910, 911
See application file for complete search history.

(56) References Cited

U.S. PATENT DOCUMENTS 7,530,416 B2 * 5/2009 Suzuki ...................... 180/65.51
7,819,214 B2 * 10/2010 Mizutani et al. ........... 180/65.51

FOREIGN PATENT DOCUMENTS

| JP | 07-96752 | 4/1995 |
| JP | 2001-315534 | 11/2001 |
| JP | 2008-132941 | 6/2008 |
| JP | 2008-189212 | 8/2008 |
| JP | 2009-052630 | 3/2009 |
| JP | 2009-174593 | 8/2009 |
| JP | 2009-257494 | 11/2009 |

OTHER PUBLICATIONS

Mechanical translation of JP2009-257494.*
Mechanical translation of JP2009257494, Nov. 5, 2009.*

* cited by examiner

*Primary Examiner* — John Walters
(74) *Attorney, Agent, or Firm* — Clark & Brody

(57) ABSTRACT

The in-wheel motor drive assembly 21 includes: a motor unit A; a wheel hub bearing unit having a tubular wheel hub 32, a cylindrical outer-ring-side member 22c surrounding the outer circumferential surface of the wheel hub, and a wheel hub bearing 33 disposed in an annular space formed between the outer circumferential surface of the wheel hub and the inner circumferential surface of the outer-ring-side member to rotatably support the wheel hub; and a speed reduction unit 101 being a speed reduction mechanism having an output shaft 28 extending in one direction and an input shaft 25 extending in the other direction and reducing the rotational speed of the input shaft and transmitting the reduced rotation to the output shaft, the output shaft being fixedly inserted in the center of the wheel hub 32 and the input shaft being fixedly inserted in the motor rotary shaft 35.

10 Claims, 7 Drawing Sheets

IN-WHEEL MOTOR DRIVE ASSEMBLY

TECHNICAL FIELD

The present invention relates to an in-wheel motor drive assembly disposed in an interior space of a road wheel to drive a wheel hub.

BACKGROUND ART

There are some known conventional in-wheel motor drives as seen in Japanese Unexamined Patent Application Publication Nos. 2009-52630 (PTL 1) and 2009-174593 (PTL 2). Each of the in-wheel motor drives disclosed in PTL 1 and PTL 2 has a drive motor, a speed reducer that receives a driving force from the drive motor and reduces rotational speed to output the reduced rotation to a wheel, and a wheel hub member coupled with an output shaft of the speed reducer, and the drive motor, speed reducer and wheel hub member are coaxially arranged in a line. The speed reducer adopts a cycloid reduction mechanism that provides a high speed reduction ratio in comparison with a general planetary gear speed reduction mechanism regarded as a conventional speed reducer. Such a configuration allows the torque required for the drive motor to be small and therefore the in-wheel motor drive to be advantageously reduced in size and weight.

In the manufacture and assembly of the in-wheel motor drives as disclosed in PTL 1 and PTL 2, an inner ring of a wheel hub bearing is fabricated by fixedly coupling a wheel hub and a wheel-side rotation member through a tube forming method. An exterior member, serving as an outer ring of the wheel hub bearing, is secured with bolts to one end face of a cylindrical speed-reduction-unit casing, serving as an outer circumferential surface of the speed reduction unit. Then, rotation members, two curved plates, inner pins, outer pins, and some other components are inserted in a predetermined order from an opening on the other end of the speed-reduction-unit casing to assemble the components one by one inside the speed reduction unit.

In the next assembly step, one end face of a cylindrical motor-unit casing is secured to the end face, in which the opening is formed, of the speed-reduction-unit casing. Since the motor unit disclosed in PTL 1 is an axial gap motor with stators on opposite sides of the motor unit in an axial direction, a stator for one side is first inserted, then a rotor is inserted, and a stator for the other side is inserted into the motor-unit casing from an opening formed on the other end thereof to assemble the components one by one inside the motor unit.

Since the motor unit in PTL 2 is a radial gap motor, components are inserted from an opening on an end of a motor-unit casing, separately, in a predetermined order and assembled one by one inside the motor unit. More specifically, after an end face of the motor-unit casing is secured to an end face of the speed-reduction-unit casing, a stator is first inserted from an opening on the other end of the motor-unit casing and then secured to an inner circumferential surface of the casing. Second, a rotor is inserted and the rotary shaft of the rotor is secured to an end of a rotation member projecting from the speed reduction unit.

CITATION LIST

Patent Literature

PTL 1: Japanese Unexamined Patent Application Publication No. 2009-52630 (paragraphs 0043 to 0044)

PTL 2: Japanese Unexamined Patent Application Publication No. 2009-174593 (paragraphs 0058 to 0059)

SUMMARY OF INVENTION

Technical Problem

Great demands for increasing efficiency in manufacturing and assembling and for reducing cost have been growing recently. To meet the demands, further efforts are needed to improve the manufacture and assembly of the aforementioned conventional in-wheel motor drives, especially in terms of the following points. First, in the manufacture and assembly of conventional in-wheel motor drives, the components of the speed reduction unit and motor unit must be assembled one by one on a single assembly line, which requires a very long time for manufacturing and assembling the drives and therefore inhibits the improvement of assembly efficiency. Thus, there is room for improvement in terms of assembling time.

Second, because the rotor, when inserted, is attracted to the stator, the in-wheel motor drive in PTL 2 needs to be assembled while being adjusted in angle so that the rotor does not tilt with respect to the axis. Thus, there is room for improvement in terms of labor-saving for the rotor attachment.

Third, since the rotor of the in-wheel motor drive in PTL 2 is supported at its opposite ends with bearings disposed on one end and the other end of the motor-unit casing, the bearings on the opposite ends need to be precisely aligned with the axis of the rotor. To achieve the precise alignment, a disc-like pump casing that supports the outer ring of the bearing on one end of the motor-unit casing and a disc-like rear cover that supports the outer ring of the bearing on the other end of the motor-unit casing must be preassembled to concurrently assemble both the bearings, which increases the assembly and processing costs. Thus, there is room for improvement in terms of the efficiency of attachment operations of the bearings for supporting the rotor's rotary shaft.

In view of the circumstances, firstly the present invention has an object to provide an in-wheel motor drive assembly that can be assembled in a shorter time. Secondly, the invention has an object to provide an in-wheel motor drive assembly with a rotor that is not tilted in assembly. Thirdly, the invention has an object to provide an in-wheel motor drive assembly with bearings that can be attached on opposite ends of a motor rotary shaft, with ease and precision, in alignment with an axis.

Solution to Problem

To achieve the objects, the in-wheel motor drive assembly according to the present invention includes: a motor unit with a tubular motor rotary shaft extending in an axial direction; a wheel hub bearing unit with a tubular wheel hub, a cylindrical outer-ring-side member surrounding the outer circumferential surface of the wheel hub and a wheel hub bearing provided in an annular space formed between the outer circumferential surface of the wheel hub and the inner circumferential surface of the outer-ring-side member and rotatably supporting the wheel hub; and a speed reduction unit adopting a speed reduction mechanism having an output shaft extending in one direction and an input shaft extending in the other direction to reduce the rotational speed of the input shaft and transmit the reduced rotation to the output shaft, the output shaft being fixedly inserted in the center of the tubular wheel hub, and the input shaft being fixedly inserted in an axial end of the tubular motor rotary shaft.

The speed reduction unit according to the present invention can be assembled as an assembly on an assembly line different from the one for assembling the in-wheel motor drive assembly. Therefore, while the wheel hub bearing unit is assembled on the assembly line for the in-wheel motor drive assembly, the speed reduction unit can be assembled in another assembly line and then the wheel hub bearing unit and speed reduction unit can be coupled on the assembly line for the in-wheel motor drive assembly, thereby shortening the assembly time. Incidentally, the in-wheel motor drive assembly may be an air cooled type or water cooled type.

According to the present invention, since the wheel hub and wheel hub bearing are components of the wheel hub bearing unit as an assembly, fabricating the inner ring of the wheel hub bearing by the tube forming method, as has been done for the in-wheel motor drive assembly disclosed in PTL 1 and PTL 2, becomes unnecessary. Therefore, the wheel hub bearing unit and speed reduction unit can be concurrently assembled on different assembly lines.

In the in-wheel motor drive assembly according to the present invention, the rotor to be placed in the motor unit can be produced by assembling individual parts on a one-by-one basis on the assembly line for the in-wheel motor drive assembly; however, it is preferable to assemble the rotor on a different assembly line. In an embodiment of the present invention, the motor unit includes a motor-unit casing forming the contour of the motor unit, a stator secured to the inner circumferential surface of the motor-unit casing, and a rotor unit having a motor rotary shaft and a rotor secured to the outer circumferential surface of the motor rotary shaft and placed in an interior space of the motor-unit casing so as to face the stator.

The rotor unit according to the embodiment can be assembled as an assembly on an assembly line different from the one for the in-wheel motor drive assembly. Therefore, while the wheel hub bearing unit and speed reduction unit are coupled on the assembly line for the in-wheel motor drive assembly, the rotor unit can be assembled on a different assembly line and then the speed reduction unit and rotor unit can be coupled on the assembly line for the in-wheel motor drive assembly, thereby shortening the assembly time. Alternatively, the speed reduction unit can be first coupled to the rotor unit and then the wheel hub bearing unit can be coupled to the speed reduction unit.

The rotor unit of the present invention is embodied in various ways. A rotor unit of an embodiment further includes a motor-rotary-shaft supporting member that is attached on one axial end of the motor rotary shaft and fixedly coupled with the motor-unit casing or speed-reduction-unit casing housing the speed reduction unit to rotatably support the motor rotary shaft. According to the embodiment in which the rotor unit further includes the motor-rotary-shaft supporting member attached on one axial end of the motor rotary shaft, the rotor unit can be fixedly attached inside the motor-unit casing prior to the stator to rotatably support the rotor. Therefore, the motor unit can be assembled with the rotor that is not tilted in assembly, thereby saving labor for the attachment operation of the rotor.

The motor-rotary-shaft supporting member may be a bracket component or a component disposed across the casing interior space and extending perpendicular to the axis. Preferably, the motor-rotary-shaft supporting member includes a partition wall that separates the interior space of the speed-reduction-unit casing from the interior space of the motor-unit casing and a motor unit bearing that is provided in a center bore formed at the center of the partition wall and has an axial end of the motor rotary shaft passing therethrough to rotatably support the motor rotary shaft.

More preferably, the partition wall includes a tubular portion extending along the axis and forming the center bore and a main wall portion formed on an axial end of the tubular portion and secured to the inside of the casing. The motor unit bearing is disposed on the opposite ends of the tubular portion. According to the embodiment, the motor rotary shaft is rotatably supported at two points at the axially opposite ends of the center bore of the partition wall with the motor unit bearings. During the assembling operation, the motor unit bearings can be easily positioned by means of the tubular portion of the partition wall so as to precisely align the bearings with the axis. Therefore, easy and precise alignment of the motor unit bearings with the axis at the opposite ends of the motor rotary shaft is achieved, thereby increasing the efficiency of the attachment operation of the motor unit bearings.

The partition wall installed in the in-wheel motor drive assembly of the present invention is to separate the speed reduction unit from the motor unit in the casing; however, the partition wall can be a simple wall material or can be provided with an oil pump driven by the speed reduction unit to discharge lubrication oil. If the oil pump is provided, it is preferable to provide a discharge oil passage through which the lubrication oil discharged from the oil pump flows and an intake oil passage for feeding the lubrication oil to the oil pump on a surface of or inside the partition wall.

The casing of the present invention can be made by fabricating the motor-unit casing, speed-reduction-unit casing and outer-ring-side member separately and fixedly coupling these casings with given coupling members, such as bolts; however, it is also preferable to dispose the outer-ring-side member of the wheel hub bearing unit on one axial side of of the in-wheel motor drive assembly, integrally connect the speed-reduction-unit casing with the motor-unit casing to form a speed-reduction-unit/motor-unit common casing, dispose the speed-reduction-unit/motor-unit common casing on the other axial side of the in-wheel motor drive assembly, and fixedly couple both casings with given coupling members. According to the embodiment, the speed-reduction-unit casing and motor-unit casing are integrally connected with each other to form the speed-reduction-unit/motor-unit common casing, and therefore the step of fixedly coupling the speed-reduction-unit casing and motor-unit casing can be eliminated from the assembly line, thereby improving operation efficiency. This configuration also eliminates position tolerance control between the speed reduction unit and motor unit, and therefore the stator can be precisely attached to the inner circumferential surface of the casing.

Although the present invention is not limited to one embodiment, the outer-ring-side member of the wheel hub bearing unit may be integrally connected with the speed-reduction-unit casing to form a wheel-hub-bearing/speed-reduction-unit common casing, the wheel-hub-bearing/speed-reduction-unit common casing may be disposed on one axial side of the in-wheel motor drive assembly, the motor-unit casing may be disposed on the other axial side of the in-wheel motor drive assembly, and both of these casings may be fixedly coupled with given coupling members. According to the embodiment, the outer-ring-side member and speed-reduction-unit casing are integrally connected with each other to form the outer-ring-side member/speed reduction unit common casing, and therefore the step of fixedly coupling the outer-ring-side member and speed-reduction-unit casing can be eliminated from the assembly line, thereby improving operation efficiency. This configuration also eliminates position tolerance control between the wheel hub bearing unit and speed reduction unit.

Preferably, the outer-ring-side member of the wheel hub bearing unit, the speed-reduction-unit casing and the motor-unit casing are integrally connected to form an in-wheel-motor common casing. Since the outer-ring-side member, speed-reduction-unit casing and motor-unit casing are integrally connected to form the in-wheel-motor common casing according to the embodiment, the step of fixedly coupling each casing can be eliminated from the assembly line, thereby improving operation efficiency. This configuration also eliminates position tolerance control among the units.

Preferably, the motor unit further includes a light alloy rear cover attached on an end of the motor-unit casing forming the contour of the motor unit and shielding and protecting the interior space of the motor unit from the outside. According to the embodiment, the use of the light alloy can reduce the weight of the in-wheel motor drive assembly. A possible light alloy is aluminum alloy, but magnesium alloy is more preferable.

Preferably, the speed reduction unit further includes: a disc-like eccentric member disposed on one end of the input shaft; a revolution member attached on an outer circumferential surface of the eccentric member so as to rotate relative to the eccentric member and making orbital motion around a rotational axis of the input shaft; a perimeter engagement member engaged with the perimeter of the revolution member to cause the revolution member to make axial rotation; a perimeter-engagement-member holding member in the shape of a cylinder surrounding the perimeter of the revolution member, holding the perimeter engagement member and fixedly coupled with the motor-unit casing forming the contour of the motor unit, the speed-reduction-unit casing housing the speed reduction unit or outer-ring-side member; and a motion conversion mechanism disposed across the output shaft and revolution member and extracting axial rotation of the revolution member to transmit the axial rotation to the output shaft. According to the embodiment, the speed reduction unit adopting the cycloid reduction mechanism can increase the degree of speed reduction more than planetary gear trains. Therefore, a high speed rotation type motor can be employed as the motor unit.

Advantageous Effects of Invention

As described above, the present invention provides the wheel hub bearing unit having the tubular wheel hub and a cylindrical outer-ring-side member surrounding the outer circumferential surface of the wheel hub and rotatably supporting the wheel hub, and the speed reduction unit having the output shaft extending in one direction and the input shaft extending the other direction, the output shaft being fixedly inserted in the center of the tubular wheel hub. The invention allows the wheel hub bearing unit to be treated as a single assembly and the speed reduction unit as another single assembly. Therefore, while the wheel hub bearing unit is assembled on the assembly line for the in-wheel motor drive assembly, the speed reduction unit can be assembled on a different assembly line. The concurrently operative multiple assembly lines enable shortening of assembling times.

DESCRIPTION OF EMBODIMENT

Figure 1:
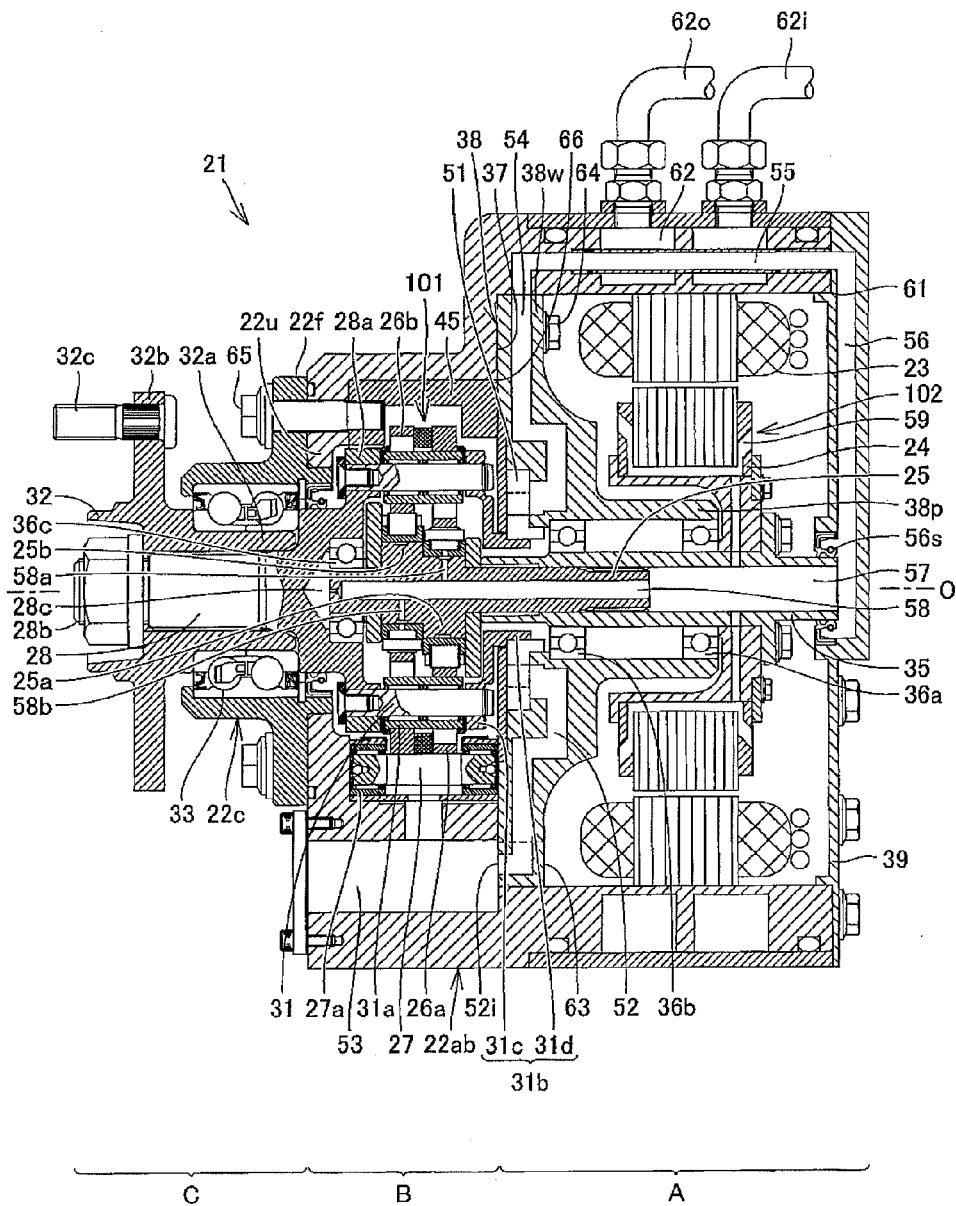
FIG. 1 is a vertical cross-sectional view of an in-wheel motor drive assembly according to an example of the present invention.
Figure 2:
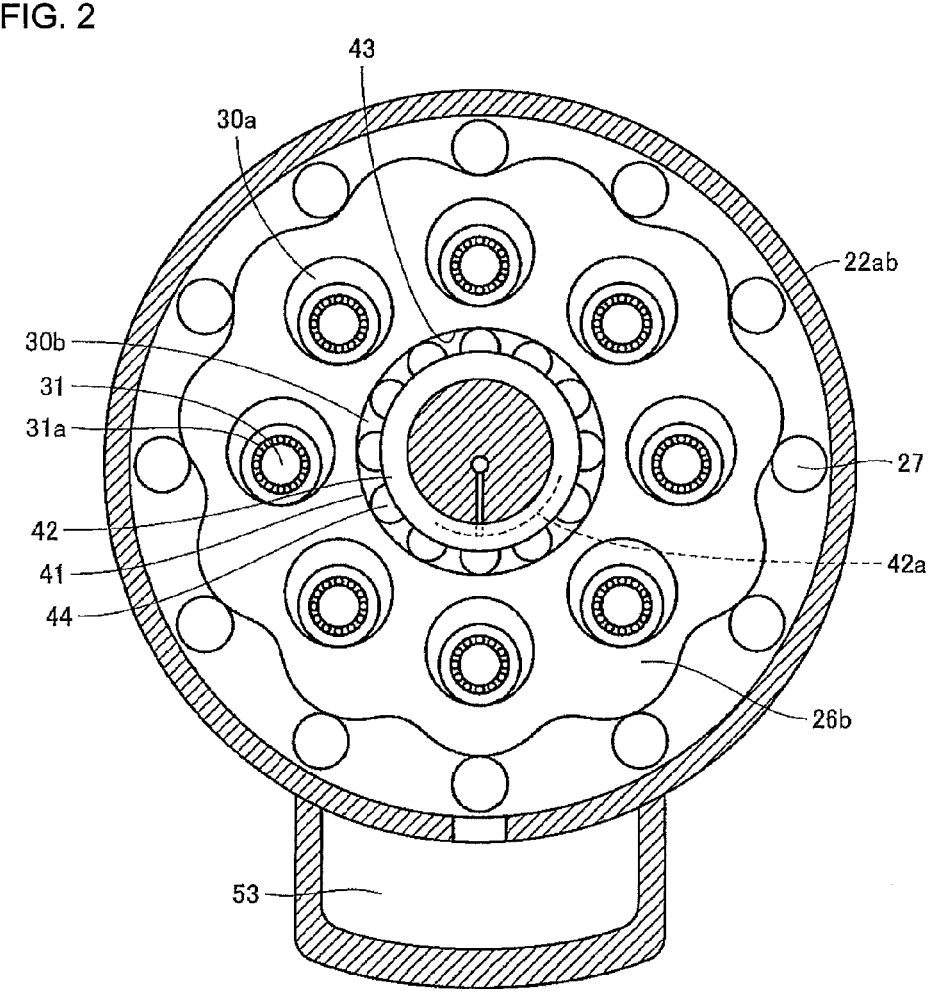
FIG. 2 is a transverse cross-sectional view of a speed reduction unit of the example.
Figure 3:
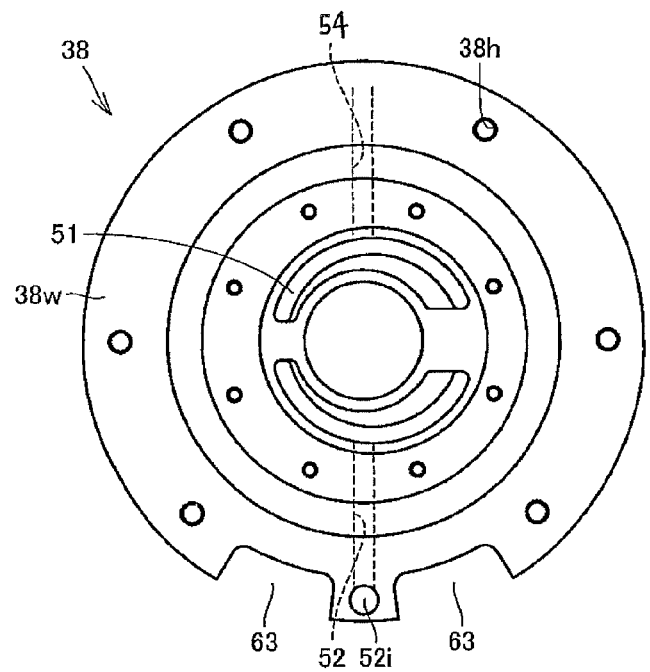
FIG. 3 is a front view of a pump casing, removed from the assembly, of the example.
Figure 4:
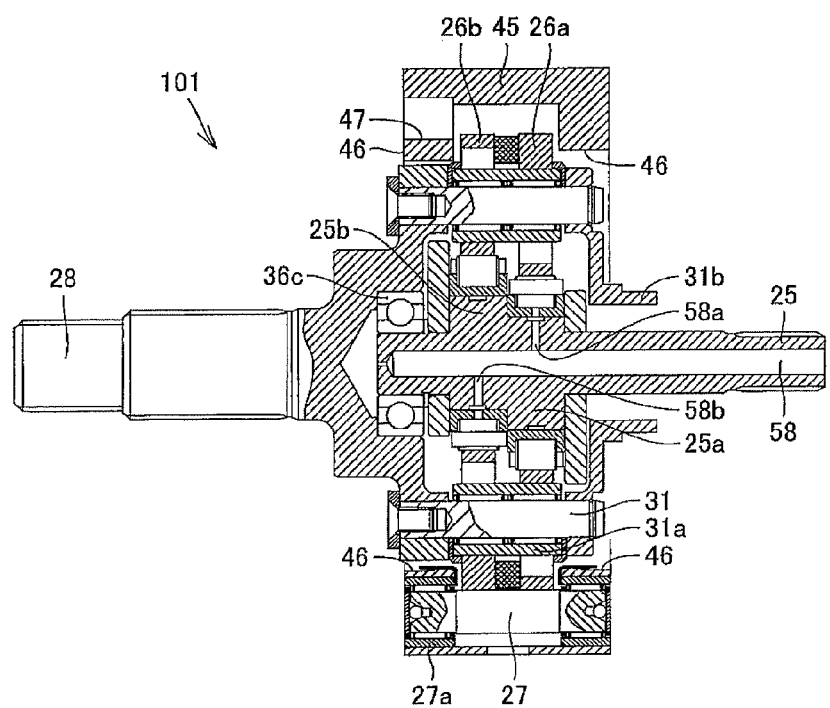
FIG. 4 is a vertical cross-sectional view of the speed reduction unit, removed from the assembly, of the example.
Figure 5:
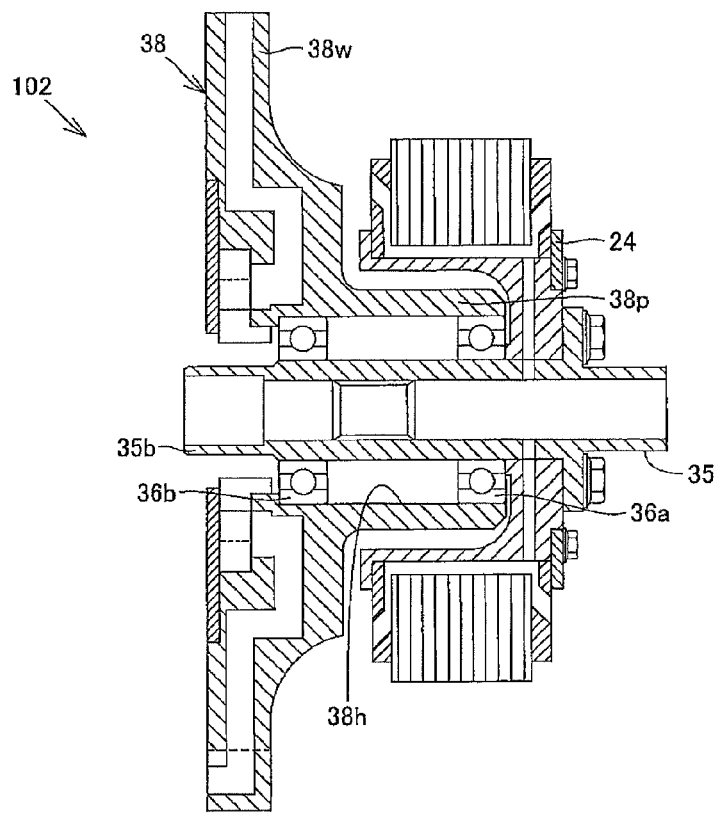
FIG. 5 is a vertical cross-sectional view of a rotor unit, removed from the assembly, of the example.
Figure 6:
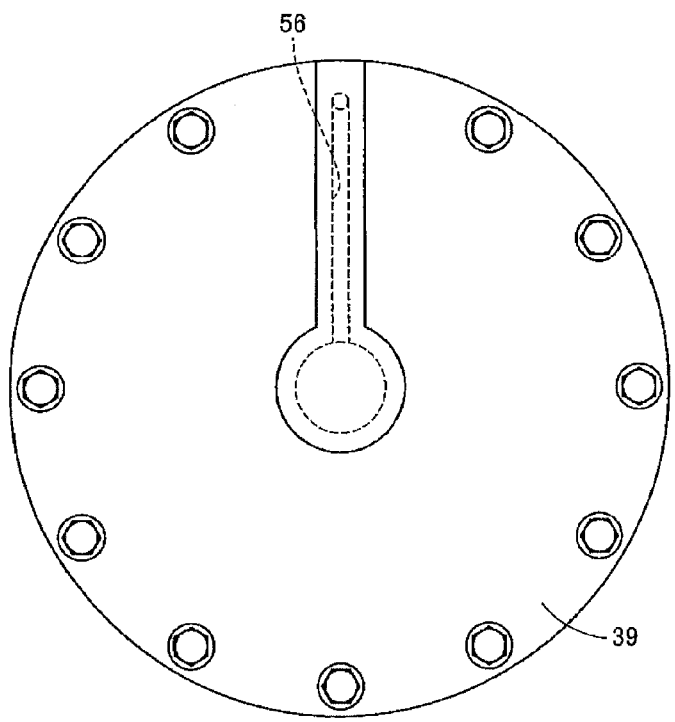
FIG. 6 is a front view of a rear cover, removed from the assembly, of the example.

An embodiment of the present invention will be described in detail below based on examples shown in the drawings. FIG. 1 is a vertical cross-sectional view of an in-wheel motor drive assembly according to an example of the present invention. FIG. 2 is a transverse cross-sectional view of a speed reduction unit according to the example. FIG. 3 is a front view of a pump casing, removed from the assembly, of the example. FIG. 4 is a vertical cross-sectional view of the speed reduction unit, removed from the assembly, of the example. FIG. 5 is a vertical cross-sectional view of a rotor unit, removed from the assembly, of the example. FIG. 6 is a front view of a rear cover, removed from the assembly, of the example.

The in-wheel motor drive assembly 21 that is disposed in an interior space of a road wheel to drive the wheel includes a motor unit A for generating driving force, a speed reduction unit B for reducing the rotational speed of the motor unit A and outputting the reduced rotation, and a wheel hub bearing unit C transferring the output from the speed reduction unit B to the wheel (not shown). The motor unit A, speed reduction unit B and wheel hub bearing unit C are coaxially aligned in this order in a line. The in-wheel motor drive assembly 21 is mounted in a wheel housing of, for example, an electric vehicle or hybrid drive vehicle.

The motor unit A is a radial gap motor including a common casing 22ab forming a contour thereof, a stator 23 secured to the common casing 22ab, a rotor 24 arranged so as to be opposed to the inner side of the stator 23 with a radial gap therebetween, and a motor rotary shaft 35 fixedly coupled inside the rotor 24 to rotate together with the rotor 24.

The common casing 22ab is in a cylindrical shape and placed across the speed reduction unit B, which is positioned on one end portion in the direction of an axis O (left side in FIG. 1), and the motor unit A, which is positioned on the other end portion in the direction of the axis O (right side in FIG. 1). The common casing 22ab has a small-diameter inner circumferential surface for the speed reduction unit B, a large-diameter inner circumferential surface for the motor unit A, and an annular step 37 formed between the speed reduction unit B and the motor unit A. In other words, the common casing 22ab is a motor-unit/speed-reduction-unit common casing with one end portion in the direction of the axis O (left side in FIG. 1) forming the contour of the speed reduction unit B and the other end portion in the direction of the axis O (right side in FIG. 1) forming the contour of the motor unit A. The inner circumferential surface of the common casing 22*ab* supports a stator 23 in the motor unit A. The motor unit A is separated from the speed reduction unit B by a partition wall 38 arranged at a center portion of the common casing 22*ab* in the direction of the axis O.

The partition wall 38 includes a tubular portion 38*p* extending in the direction of the axis O and through which the motor rotary shaft 35 passes, and a disc-like main wall portion 38*w* formed on an axial end of the tubular portion 38*p*. The main wall portion 38*w* has an outer diameter approximately the same as the inner diameter of the common casing 22*ab* of the motor unit A. Holes 38*h* for receiving bolts are equiangularly formed in an outer circumference part of the main wall portion 38*w*. The partition wall 38 is firmly attached to an inner wall of the common casing 22*ab* by inserting bolts 64 into the holes 38*h* to screw the bolts 64 into the annular step 37. At a lower part of the partition wall 38, a cut-away portion 63 is formed to connect a lower part of an interior space of the motor unit A with an oil reservoir 53 provided at a lower part of the speed reduction unit B.

Rolling bearings 36*a*, 36*b* are provided at the opposite ends of the tubular portion 38*p*. Thus, the motor rotary shaft 35 is disposed inside the motor unit A and rotatably supported at two different points on the axis O.

Of both ends of the motor rotary shaft 35 projecting from the opposite ends of the tubular portion 38*p*, one end adjacent to the speed reduction unit B is fixedly coupled to the input shaft 25. On the outer circumferential surface of the other end of the motor rotary shaft 35, the rotor 24 is secured.

The common casing 22*ab* has an opening 61 on one end thereof in the direction of the axis O. The opening 61 is sealed by a disc-like rear cover 39. The rear cover 39 is made of light alloy, such as aluminum alloy or magnesium alloy. The aluminum alloy and magnesium alloy have roughly equal tensile strengths of 290 [MPa]. The relative density of the aluminum alloy is 2.67, whereas the magnesium alloy is 1.78. Therefore, a rear cover 39 made of magnesium alloy can achieve further weight reduction.

Of the common casing 22*ab*, a casing part included in the motor unit A has an inner diameter equal to or larger than the outer diameter of the partition wall 38. The opening 61 also has a diameter equal to or larger than the outer diameter of the partition wall 38. Therefore, the partition wall 38 can be inserted through the opening 61 in an axial direction.

The speed reduction unit B includes the common casing 22*ab* forming a contour thereof, an input shaft 25 fixedly coupled with the motor rotary shaft 35, and an output shaft 28 reducing the rotational speed of the input shaft 25 and outputting the reduced rotation. The speed reduction unit B is disposed on a side of the motor unit A in the direction of the axis O. Specifically, the speed reduction unit B adopts a cycloid reduction mechanism. The input shaft 25 of the speed reduction unit B extends along the axis O and projects toward the motor unit A. The projecting end of the input shaft 25 is fixedly coupled with an axial end of the motor rotary shaft 35. Since the motor rotary shaft 35 of the motor unit A and the input shaft 25 of the speed reduction unit B rotates together, the shafts are also collectively referred to as a motor-side rotation member. The other end of the input shaft 25 that is remote from the motor unit A is supported by a rolling bearing 36*c* in the speed reduction unit B.

Two disc-like eccentric members 25*a*, 25*b* are secured to an outer circumferential surface of the input shaft 25. The motor rotary shaft 35 and input shaft 25 are aligned with the rotational axis O of the in-wheel motor drive assembly 21, but the centers of the eccentric members 25*a*, 25*b* are not aligned with the axis O. In addition, the two eccentric members 25*a*, 25*b* are provided such that their phases are shifted by 180° in order to counterbalance the centrifugal forces generated by eccentric motion thereof.

Curved plates 26*a*, 26*b* rotatably hold the outer circumferential surface of the eccentric members 25*a*, 25*b*, respectively, serving as revolution members. The curved plates 26*a*, 26*b* have outer perimeters curved in waves with which a plurality of outer pins 27, serving as perimeter engagement members, are engaged. The outer pins 27 are rotatably attached with their opposite ends to an outer-pin holder 45 with needle roller bearings 27*a* therebetween. The outer-pin holder 45, serving as perimeter-engagement-member holding member, is in the shape of a cylinder so as to surround the outer perimeters of the curved plates 26*a*, 26*b*, and hold the outer pins 27 in parallel with the axis O. The outer circumferential surface of the outer-pin holder 45 is fixedly attached to the inner circumferential surface of the common casing 22*ab* of the speed reduction unit B. The common casing 22*ab* is fixedly coupled to a cylindrical outer-ring-side member 22*c* at one side in the direction of the axis O (left side in FIG. 1).

A description will be made about a speed-reduction-unit casing (a casing part enclosing the speed reduction unit B) occupying one side of the common casing 22*ab* in the direction of the axis O. The speed-reduction-unit casing has an inward flange portion 22*u* formed on one end thereof in the direction of the axis O and an opening 66 formed in the other end thereof in the direction of the axis O. The speed-reduction-unit casing has an inner diameter approximately the same as the outer diameter of the outer-pin holder 45. Therefore, the outer-pin holder 45 can be inserted through the opening 66 in an axial direction.

The output shaft 28 of the speed reduction unit B is aligned with the rotational axis O, projects from the speed reduction unit B in one direction of the axis O, extends to the wheel hub bearing unit C, and includes a flange portion 28*a* and shaft portion 28*b*. In an end face of the flange portion 28*a* disposed in the speed reduction unit B, holes in which inner pins 31 are screwed are equidistantly formed along the circumference centered on the rotational axis O of the output shaft 28. A wheel hub 32 is fixedly coupled to the outer circumferential surface of the shaft portion 28*b* disposed in the wheel hub bearing unit C. Since the output shaft 28 of the speed reduction unit B and the wheel hub 32 of the wheel hub bearing unit C rotate together, the shaft and hub are also collectively referred to as a wheel-side rotation member. The inner pins 31 implanted in the flange portion 28*a* project in the other direction of the axis O, and the projecting ends are engaged with radially center regions of the curved plates 26*a*, 26*b*. The flange portion 28*a* has a center bore 28*c* that receives one end of the input shaft 25 and supports the end of the input shaft 25 with the rolling bearing 36*c* so as to rotate relative to the input shaft 25.

Referring now to FIG. 2, the curved plate 26*b* has a plurality of waveforms in the form of trochoid curves, such as epitrochoid curves, along its perimeter, and has a plurality of through holes 30*a* and 30*b* penetrating from one side end face to the other side end face. The through holes 30*a* are equidistantly formed in the circumferential direction centered on the rotational axis of the curved plate 26*b*, while being formed in a radial middle region between the outer perimeter edge and inner circumferential edge of the curved plate 26*b*, and receive the inner pins 31 which will be described later. The through hole 30*b* is formed at the center (rotational axis) of the curved plate 26*b* and forms the inner circumference of the curved plate 26*b*. The curved plate 26*b* is attached to the outer circumferential surface of the eccentric member 25*b* so as to rotate relative to the eccentric member 25*b*.

The curved plate 26b is rotatably supported by the rolling bearing 41 to the eccentric members 25b. The rolling bearing 41 is a cylindrical roller bearing including an inner ring member 42 whose inner circumferential surface fits along the outer circumferential surface of the eccentric member 25b and whose outer circumferential surface has an inner raceway 42a formed thereon, an outer raceway 43 that is directly formed in the inner circumferential surface of the through hole 30b of the curved plate 26b, a plurality of cylindrical rollers 44 arranged between the inner raceway 42a and outer raceway 43, and a retainer (not shown) that retains the interval between the circumferentially adjacent cylindrical rollers 44. The rolling bearing 41 can be a deep groove ball bearing. The inner ring member 42 further includes a pair of shoulders axially opposed to each other on the inner raceway 42a on which the cylindrical rollers 44 roll. The cylindrical rollers 44 are retained between the shoulders. The curved plate 26a is configured in the same manner.

The outer pins 27 are equidistantly provided along an imaginary circle centered on the rotational axis O of the input shaft 25. The outer pins 27 extend in parallel with the axis O and are held at the opposite ends by the outer-pin holder 45 fixedly fitted in an inner wall of the common casing 22ab that houses the speed reduction unit B. More specifically, the opposite ends of the outer pins 27 in the direction of the axis O are rotatably supported by needle roller bearings 27a attached to the outer-pin holder 45.

When the curved plates 26a, 26b make orbital motion around the rotational axis O of the input shaft 25, the curved waveforms engage with the outer pins 27 to cause the curved plates 26a, 26b to make axial rotation. In addition, the needle roller bearings 27a attached to the opposite ends of the outer pins 27 reduce frictional resistance between the curved plates 26a, 26b and the outer pins 27 abutting the outer perimeters of the curved plates 26a, 26b.

The motion conversion mechanism includes a plurality of inner pins 31 serving as inner engagement members implanted in the flange portion 28a of the output shaft 28 and through holes 30a formed in the curved plates 26a, 26b. The inner pins 31 are equidistantly provided on an imaginary circle centered on the rotational axis O of the output shaft 28, extend in parallel with the axis of the output shaft 28, and have base ends secured to the output shaft 28. In addition, needle roller bearings 31a, each made up with a hollow cylinder and needle rollers, are provided on the outer circumferential surfaces of the inner pins 31. The needle roller bearings 31a reduce frictional resistance between the curved plates 26a, 26b and the inner pins 31 abutting the inner circumferential surfaces of the through holes 30a of the curved plates 26a, 26b.

The tip ends of the inner pins 31 are fixedly coupled with an inner-pin reinforcing member 31b for reinforcing the inner pins 31 by press-fitting the tip ends into the inner-pin reinforcing member 31b. The inner-pin reinforcing member 31b includes an annular flange portion 31c for connecting the tip ends of the inner pins 31 and a cylindrical tubular portion 31d connected with the inner circumference of the flange portion 31c and extending in the axial direction away from the inner pins 31. The inner-pin reinforcing member 31b, which reinforces the plurality of inner pins 31, evenly distributes the loads on some inner pins 31 applied by the curved plates 26a, 26b to all inner pins 31.

The inner pins 31 pass through the through holes 30a formed in radial parts of the curved plates 26a, 26b between the perimeter of the curved plates 26a, 26b and the axis of the input shaft 25. The through holes 30a are formed so as to correspond to the inner pins 31, respectively. In addition, the diameter of the through holes 30a is designed to be larger by a predetermined size than the outer diameter of the inner pins 31 (referring to "the maximum outer diameter including the outer diameter of the needle roller bearing 31a, and the same is applied hereinafter). Therefore, the inner pins 31 extending through the through holes 30a formed in the curved plates 26a, 26b function as inner engagement members respectively engaged with the through holes 30a.

The tubular portion 31d is drivingly connected with a lubrication oil pump 51 attached along the partition wall 38. When the plurality of inner pins 31 revolve with the output shaft 28, the tubular portion 31d coupled with the inner pins 31 drives the lubrication oil pump 51. The lubrication oil pump 51 provided inside the casing 22 is driven by an output of the motor unit A to circulate lubrication oil inside the in-wheel motor drive assembly 21.

An intake oil passage 52 provided in the main wall portion 38w of the partition wall 38 extends downwardly from an inlet port of the lubrication oil pump 51 and has an intake-oil-passage inlet port 52i at its lower part to connect with an oil reservoir 53 provided at a lower part of the speed reduction unit B. A discharge oil passage 54 provided in the main wall portion 38w has one end connected to an outlet port of the lubrication oil pump 51 and the other end connected to an end of a casing oil passage 55 provided in the common casing 22ab corresponding to the position of the motor unit A.

The casing oil passage 55 is formed inside a hollow cylindrical wall, which makes up the outer circumferential part of the motor unit A, of the common casing 22ab. Since the example shown in FIG. 1 directs to a water-cooled in-wheel motor drive assembly, the common casing 22ab enclosing the motor unit A further includes a cooling water passage 62 through which cooling water flows. The cooling water passage 62 has a cooling-water inlet port 62i and cooling-water outlet port 62o. The cooling-water inlet port 62i supplies cooling water. The cooling water increased in temperature is drained from the cooling-water outlet port 62i thereby to fill the cooling water passage 62 with low-temperature cooling water. Thus, the cooling water passage 62 cools the motor unit A, while lubrication oil flowing through the casing oil passage 55 of the motor unit A is cooled. The casing oil passage 55 has another end connected to a radially outer end of a communication oil passage 56.

The communication oil passage 56 is formed inside a rear cover 39 for sealing the end of the common casing 22 in the direction of the axis O. A radially inner end of the connection oil passage 56 is connected to a motor-rotary-shaft oil passage 57 provided in the motor rotary shaft 35. On the radially inner end of the communication oil passage 56, a ring-like seal member 56s is attached coaxially with the axis O. The seal member 56s liquid-tightly covers the outer circumferential surface around an end of the rapidly rotating motor rotary shaft 35.

The motor-rotary-shaft oil passage 57 formed inside the motor rotary shaft 35 extends along the axis O. Of the opposite ends of the motor-rotary-shaft oil passage 57, an end near the speed reduction unit B is connected to a speed-reduction-unit input-shaft oil passage 58 formed in the input shaft 25 and extending along the axis. The other end remote from the speed reduction unit B is connected to a radially inner end of the aforementioned communication oil passage 56. In addition, the motor-rotary-shaft oil passage 57 is connected at the axially middle part to a radially inner end of a rotor oil passage 59.

The speed-reduction-unit input-shaft oil passage 58, which is formed in the input shaft 25 and extends along the axis O, passes through the input shaft 25 to the end facing the flange portion 28a. Also, the speed-reduction-unit input-shaft oil passage 58 is branched into a lubrication oil passage 58a extending radially outward through the eccentric member 25a and a lubrication oil passage 58b extending radially outward through the eccentric member 25b. The radially outer ends of the lubrication oil passages 58a, 58b are connected with the inner raceway 42a of the rolling bearing 41.

The rotor oil passage 59 branched from the motor-rotary-shaft oil passage 57 branches out inside the rotor 24. One of the branched rotor oil passages 59 has a radially outer end directed toward the main wall portion 38w. The other rotor oil passage 59 has a radially outer end directed toward the rear cover 39.

The lubrication oil pump 51 to be driven by the output shaft 28 via the reinforcing member 31b takes up lubrication oil retained in the oil reservoir 53 through the intake oil passage 52 and discharges the lubrication oil to the discharge oil passage 54. The lubrication oil flowing from the discharge oil passage 54 to the casing oil passage 55 is cooled while passing through the casing oil passage 55.

Subsequently, the lubrication oil passes through the communication oil passage 56, motor-rotary-shaft oil passage 57 and speed-reduction-unit input-shaft oil passage 58 in succession and is diverted into the lubrication oil passages 58a, 58b to lubricate the rolling bearing 41 provided to the eccentric member 25a and the rolling bearing 41 provided to the eccentric member 25b. The lubrication oil flows in a radially outward direction by the action of centrifugal force and lubricates even the curved plates 26a, 26b, inner pins 31 and outer pins 27 in succession. Such shaft center lubrication properly lubricates the interior of the speed reduction unit B, and the lubrication oil is trapped in the oil reservoir 53 provided in the lower part of the speed reduction unit B. As described above, the lubrication oil circulates in the motor unit A and speed reduction unit B.

The lubrication oil flowing through the rotor oil passage 59 branched from the motor-rotary-shaft oil passage 57 first cools the rotor 24 and second strikes the main wall portion 38w to reach and cool the stator 24. Simultaneously, the lubrication oil strikes the rear cover 39 to reach and cool the stator 24. Subsequently, the lubrication oil drips to a lower part of the interior space of the motor unit A and is then collected in the oil reservoir 53 provided in a lower part of the speed reduction unit B after passing through the cut-away portion 63. As described above, the diverted lubrication oil also circulates in the motor unit A and speed reduction unit B.

The wheel hub bearing unit C includes a wheel hub 32 fixedly coupled with the output shaft 28, an outer-ring-side member 22c surrounding the outer circumferential surface of the wheel hub 32, and a wheel hub bearing 33 provided in an annular space formed between the outer circumferential surface of the wheel hub 32 and the inner circumferential surface of the outer-ring-side member 22c and rotatably supporting the wheel hub 32. In addition, the wheel hub bearing unit C is disposed on one axial side of the speed reduction unit B. Therefore, the motor unit A, speed reduction unit B and wheel hub bearing unit C are coaxially aligned with the axis O in this order in a line and.

The wheel hub bearing 33 is a double row angular ball bearing having an inner ring fixedly fitting in the outer circumferential surface of the wheel hub 32. The wheel hub bearing 33 has an outer ring fixedly fitting in the inner circumferential surface of the cylindrical outer-ring-side member 22c. The wheel hub 32 includes a cylindrical hollow portion 32a connected with an end of the output shaft 28 and a flange portion 32b formed on an end of the wheel hub 32 remote from the speed reduction unit B. The flange portion 32b is fixedly coupled to a road wheel (not shown) with bolts 32c.

The operating principles of the thus configured in-wheel motor drive assembly 21 will be described in detail.

In the motor unit A, for example, a rotor 24 made of a permanent magnet or magnetic material receives electromagnetic force generated by supplying AC current to a coil of the stator 23 and then rotates.

The rotation of the rotor 24 allows the motor rotary shaft 35 connected with the rotor 24 to output rotation, and the rotation of the motor rotary shaft 35 and input shaft 25 causes the curved plates 26a, 26b to make orbital motion around the rotational axis O of the input shaft 25. At that time, the outer pins 27 roll on the curved waveforms of the curved plates 26a, 26b so as to engage therewith to cause the curved plates 26a, 26b to make axial rotation in the reverse direction of the input shaft's 25 rotation.

The inner pins 31, which are inserted in the through holes 30a and are sufficiently smaller in diameter than the through holes 30a, abut against the walls of the through holes 30a with the axial rotation of the curved plates 26a, 26b. Thus, the orbital motion of the curved plates 26a, 26b is not transmitted to the inner pins 31, but only the axial rotation of the curved plates 26a, 26b is transmitted to the wheel-hub bearing unit C via the output shaft 28. As described above, the through holes 30a and inner pins 31 play a role of the motion conversion mechanism.

Through the motion conversion mechanism, the output shaft 28 coaxially aligned with the input shaft 25 extracts the axial rotation of the curved plates 26a, 26b as an output of the speed reduction unit B. Consequently, the rotational speed of the input shaft 25 is reduced by the speed reduction unit B and transmitted to the output shaft 28. Even if the adopted motor unit A produces a low torque at a high rotational speed, adequate torque required for the wheels can be transmitted.

A reduction ratio of the above-described speed reduction unit B is calculated by $(Z_A-Z_B)/Z_B$, wherein $Z_A$ represents the number of the outer pins 27 and $Z_B$ represents the number of the waveforms of the curved plates 26a, 26b. In the example shown in FIG. 2 where $Z_A$=12 and $Z_B$=11, the reduction ratio results in 1/11, which is a considerably high reduction ratio.

Adoption of such a cycloid speed reduction mechanism, capable of obtaining a high reduction ratio without multi-stage configuration, as the speed reduction unit B can provide a compact in-wheel motor drive assembly 21 with a high reduction ratio.

Next, a method of manufacturing the in-wheel motor drive assembly 21 configured as above will be described.

In a preassembly process of a casing with a wheel hub, first, a wheel hub bearing 33 is inserted into one end of an outer-ring-side member 22c in the direction of the axis O, and then a wheel hub 32 is attached to the outer-ring-side member 22c with the wheel hub bearing 33. A flange portion 22f formed on the other end of the outer-ring-side member 22c is placed on an inward flange portion 22u formed on one end of a common casing 22ab, and they are temporarily assembled. This casing with the wheel hub is assembled on an assembly line for the in-wheel motor drive assembly 21.

In addition to the preassembly process of the casing with the wheel hub, a speed reduction unit 101 shown in FIG. 4 is prepared in a preassembly process of a speed reduction unit. An input shaft 25 is disposed on one side of the speed reduction unit 101 and an output shaft 28 is disposed on the other side. Also other speed reduction components, that is, eccentric members 25a, 25b, curved plates 26a, 26b, inner pins 31, needle roller bearing 31a, outer pins 27, needle roller bearings 27*a*, and outer-pin holder 45, used to reduce the speed of the rotation of the input shaft 25 and transmit the reduced rotation to the output shaft 28, are disposed between the input shaft 25 and output shaft 28. The speed reduction unit 101 is assembled on a different assembly line from the assembly line for the in-wheel motor drive assembly 21.

In addition, inward flange portions 46 are formed on the opposite ends of the outer-pin holders 45, respectively. The inward flange portions 46 support the opposite ends of the outer pins 27, respectively. Also, the inward flange portion 46 near the output shaft 28 is provided with female thread portions 47.

In the next speed-reduction-unit attachment process, the speed reduction unit 101 is inserted from an opening 61 formed on one end of the common casing 22*ab* in the direction of the axis O toward the other end in the direction of the axis O, and the output shaft 28 of the speed reduction unit 101 is fixedly coupled with the hollow portion 32*a* of the wheel hub 32. Then, one of the inward flange portions 46 of the outer-pin holder 45 is placed on the inward flange portion, 22*u* on one side of the common casing 22*ab*, and bolts 65 are inserted from the side of the flange portion 22*f* of the outer-ring-side member 22*c* so that the end points of the bolts 65 engage with the female thread portions 47. This fixedly couples the outer-ring-side member 22*c*, common casing 22*ab* and outer-pin holder 45 together. Thus, the speed-reduction-unit attachment process for attaching the speed reduction unit 101 in the interior space of the casing is conducted on the assembly line for the in-wheel motor drive assembly 21.

In addition, the bolts 65, serving as a predetermined coupling members, pass through the flange portion 22*f* formed on one end of the outer-ring-side member 22*c* and the inward flange portion 22*u* formed on one end of the common casing 22*ab* to fixedly couple the outer-ring-side member 22*c* with the common casing 22*ab*.

In the next motor-unit assembly process, a partition wall 38, motor rotary shaft 35, rotor 24, stator 23 and some other components are inserted from the opening 61 formed on one end of the common casing 22*ab* in the direction of the axis O toward the other end in the direction of the axis O to complete the motor unit A. This motor-unit assembly process is conducted on the assembly line for the in-wheel motor drive assembly 21.

In the next motor-unit sealing process, the opening 61 formed in the end of the common casing 22*ab* in the direction of the axis O is sealed with a light alloy rear cover 39 to shield and protect the motor rotary shaft 35 from the outside. This motor-unit sealing process is conducted on the assembly line for the in-wheel motor drive assembly 21.

According to the manufacturing method, the process of preassembling the speed reduction unit 101 allows the speed reduction unit 101 to be assembled as an assembly on an assembly line different from the assembly line for the in-wheel motor drive assembly 21, thereby reducing assembling time.

Next, another method of manufacturing the in-wheel motor drive assembly 21 configured as above will be described.

First, the above-described process of preassembling a casing with a wheel hub will be performed.

In the next speed-reduction-unit assembly process, an output shaft 28, input shaft 25, and components of a speed reduction unit B for reducing the rotational speed of the input shaft 25 to transmit the reduced rotation to the output shaft 28, namely, eccentric members 25*a*, 25*b*, curved plates 26*a*, 26*b*, inner pins 31, needle roller bearing 31*a*, outer pins 27, needle roller bearings 27*a*, and outer-pin holder 45, are inserted from an opening 61 of the common casing 22*ab* in an axial direction, and the output shaft 28 is fixedly coupled to a hollow portion 32*a* of a wheel hub 32 to assemble the speed reduction unit B in an interior space of the common casing 22*ab*. The speed reduction unit B can be completed by inserting and assembling the components of the speed reduction unit B one by one or by inserting a preassembled speed reduction unit 101 in a single step and attaching it to the interior space of the casing 22*ab*. This speed-reduction-unit assembly process is conducted on the assembly line for the in-wheel motor drive assembly 21.

In addition to the speed-reduction-unit assembly process, a rotor preassembly process is performed to prepare a rotor unit 102 shown in FIG. 5. The rotor unit 102 includes a motor rotary shaft 35, a partition wall 38, which has a through bore 38*h* formed at the center through which the motor rotary shaft 35 passes to rotatably support the motor rotary shaft 35, and a rotor 24 secured to the outer circumferential surface of the motor rotary shaft 35 projecting out from the partition wall 38. The rotor unit 102 is assembled on a different assembly line from the assembly line for the in-wheel motor drive assembly 21.

In the next motor-unit assembly process, the rotor unit 102 is inserted from the opening 61 of the common casing 22*ab* in one direction of the axis O. Among opposite ends of the motor rotary shaft 35 projecting from the partition wall 38, an end 35*b* remote from the rotor 24 is fixedly coupled to the input shaft 25 of the speed reduction unit B. After the outer circumferential surface of the partition wall 38 is fixedly attached to the inner circumferential surface of the common casing 22*b*, the rotor unit 102 is attached on an end of the common casing 22*ab* opposite to the speed reduction unit B in the direction of axis O. Then, the stator 23 is fixedly attached to the inner circumferential surface of the common casing 22*ab* so as to face the rotor 24. This motor-unit assembly process is performed on the assembly line for the in-wheel motor drive assembly 21.

The aforementioned motor-unit sealing process is then conducted.

According to the manufacturing method, the process of preassembling the rotor unit 102 allows the rotor unit 102 to be assembled as an assembly on a different assembly line from the assembly line for the in-wheel motor drive assembly 21, thereby reducing assembling time.

Combining the aforementioned speed-reduction-unit preassembly process, speed-reduction-unit attachment process, rotor preassembly process and motor-unit assembly process can achieve greater assembling time reduction.

According to the manufacturing method in which the rotor unit 102 is fixedly attached in the common casing 22*ab* before the stator 23 is attached, the rotor 24 can be attached without being tilted, resulting in labor saving for attaching the rotor 24.

According to the manufacturing method in which the motor rotary shaft 35 is rotatably supported at the axially opposite ends of the through bore 38*h* of the partition wall 38 with the rolling bearing 36*a* and rolling bearing 36*b*, the tubular portion 38*p* of the partition wall 38 facilitates the positioning of the rolling bearings 36*a*, 36*b* so as to precisely align with the axis O during the assembly process. Therefore, easy and precise alignment of the rolling bearings 36*a*, 36*b* at the opposite ends of the motor rotary shaft 35 with the axis O can be achieved, thereby improving the efficiency of attaching the rolling bearings 36*a*, 36*b*.

In the above-described manufacturing method, the outer-ring-side member 22*c* for supporting the wheel hub bearing 33 provided on the outer circumferential surface of the wheel hub 32 is placed on one side along the axis. The motor-unit/speed-reduction-unit common casing 22ab that is formed by integrally connecting the speed-reduction-unit casing, which houses the speed reduction unit 101, with the motor-unit casing, which has the opening 61 and houses the rotor unit 102 and stator 23, is disposed on the other side along the axis. Then, both are fixedly coupled. This can eliminate the step of fixedly coupling the speed-reduction-unit casing and motor-unit casing on an assembly line, thereby improving operation efficiency. In addition, this also eliminates position tolerance control between the speed reduction unit B and motor unit A, and therefore the stator 23 can be precisely attached to the inner circumferential surface of the common casing 22ab. Consequently, the radial gap between the rotor 24 and stator 23 can be maintained within a specified limit.

Figure 7:
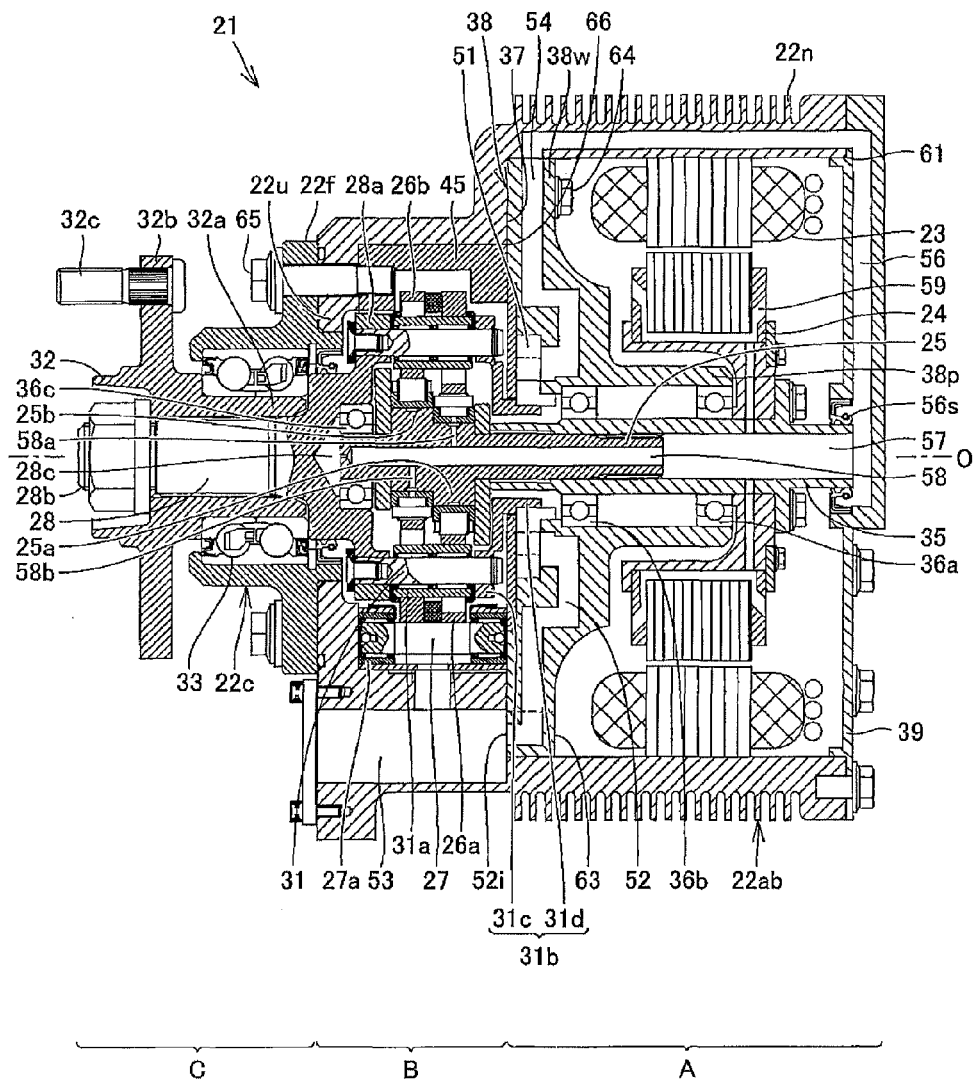
FIG. 7 is a vertical cross-sectional view of an in-wheel motor drive assembly according to a modification of the present invention.

Next, a modification of the in-wheel motor drive assembly according to the present invention will be described. FIG. 7 is a vertical cross-sectional view showing the modification of the present invention. Through the modification, components common with those in the above-described examples are marked with the same numerals as the examples and will not be further explained, but different components will be described below. This modification shows an air-cooled in-wheel motor drive assembly with a plurality of fins 22n, instead of the cooling water passage 62, formed on an outer circumferential surface of the casing.

The air-cooled in-wheel motor drive assembly 21 according to the modification can be assembled within a shortened time period, as in the case of the example shown in FIG. 1, by the multiple parallel assembly lines according to the aforementioned manufacturing method.

Figure 8:
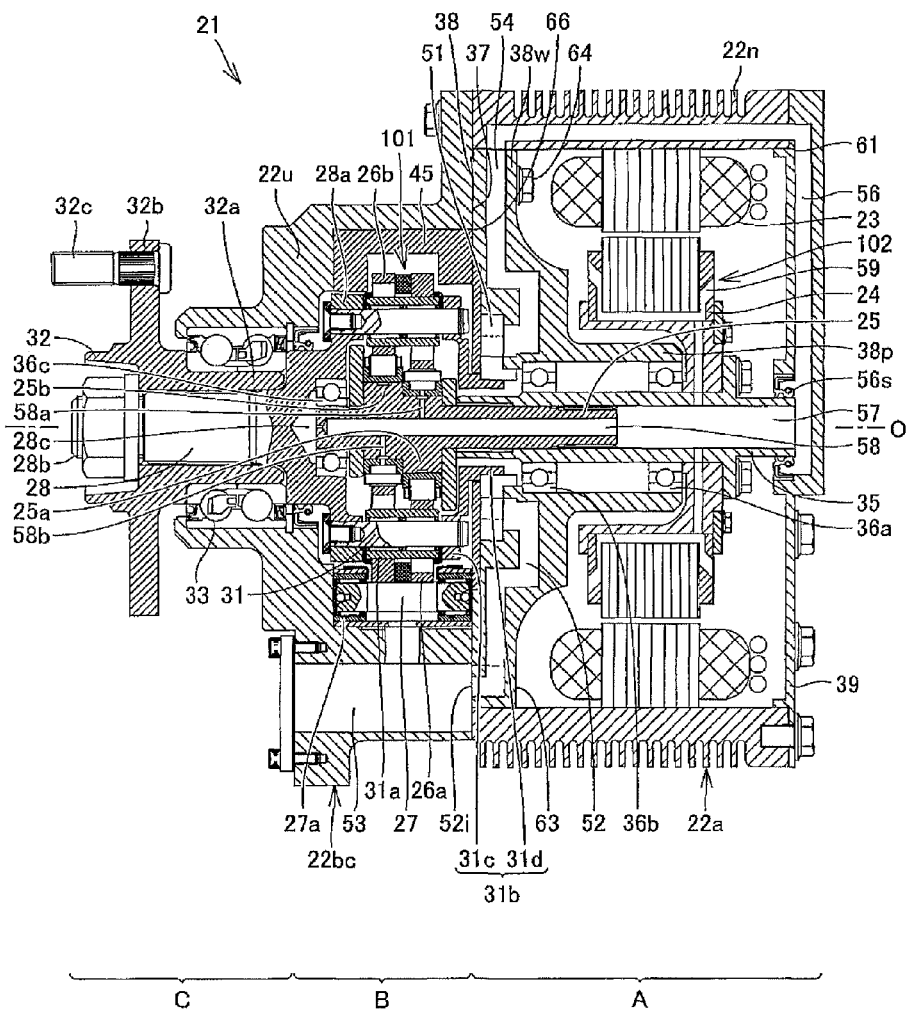
FIG. 8 is a vertical cross-sectional view of an in-wheel motor drive assembly according to another example of the present invention.

Next, an in-wheel motor drive assembly according to another example of the present invention will be described. FIG. 8 is a vertical cross-sectional view showing the example of the present invention. Through the example, components common with those in the above-described examples are marked with the same numerals as the examples and will not be further explained, but different components will be described below. In this example, an outer-ring-side member (a casing included in the wheel hub bearing unit C) provided on the outer circumferential surface of the wheel hub 32 to support the wheel hub bearing 33 is integrally connected with a speed-reduction-unit casing (a casing included in the speed reduction unit B) having an opening 66 on one end thereof along the axis O and housing the speed reduction unit 101 to form a speed-reduction-unit/wheel-hub-bearing-unit common casing 22bc that is disposed on one axial side. A motor-unit casing 22a (a casing included in the motor unit A) housing the motor rotary shaft 35 is disposed on the other axial side. Both of these casings are fixedly coupled to form a casing of the in-wheel motor drive assembly 21.

For the air-cooled in-wheel motor drive assembly 21 according to the example, the speed reduction unit 101 and rotor unit 102 also can be manufactured on different assembly lines as in the case of the example shown in FIG. 1. The above-described manufacturing method can reduce the assembling time with the multiple parallel assembly lines.

Since the in-wheel motor drive assembly according to the example shown in FIG. 8 includes the speed-reduction-unit/wheel-hub-bearing-unit common casing 22bc made by integrally connecting the outer-ring-side member, which is a casing included in the wheel hub bearing unit C, with the speed-reduction-unit casing, the step of fixedly coupling the outer-ring-side member and speed-reduction-unit casing can be eliminated from the assembly line, thereby improving operation efficiency. This also eliminates position tolerance control between the wheel hub bearing unit C and speed reduction unit B, and therefore facilitates attachment of the outer-pin holder 45 coaxially with the axis O.

When the in-wheel motor drive assembly 21 according to the example shown in FIG. 8 is manufactured, the speed reduction unit 101 is firstly inserted from the opening 66 of the speed-reduction-unit/wheel-hub-bearing-unit common casing 22bc in an axial direction to be attached in the interior space of the common casing 22bc. Then, while one axial end of the motor-unit casing 22a is placed on the opening 66, the motor-unit casing 22a may be fixedly coupled to the speed-reduction-unit/wheel-hub-bearing-unit common casing 22bc.

Figure 9:
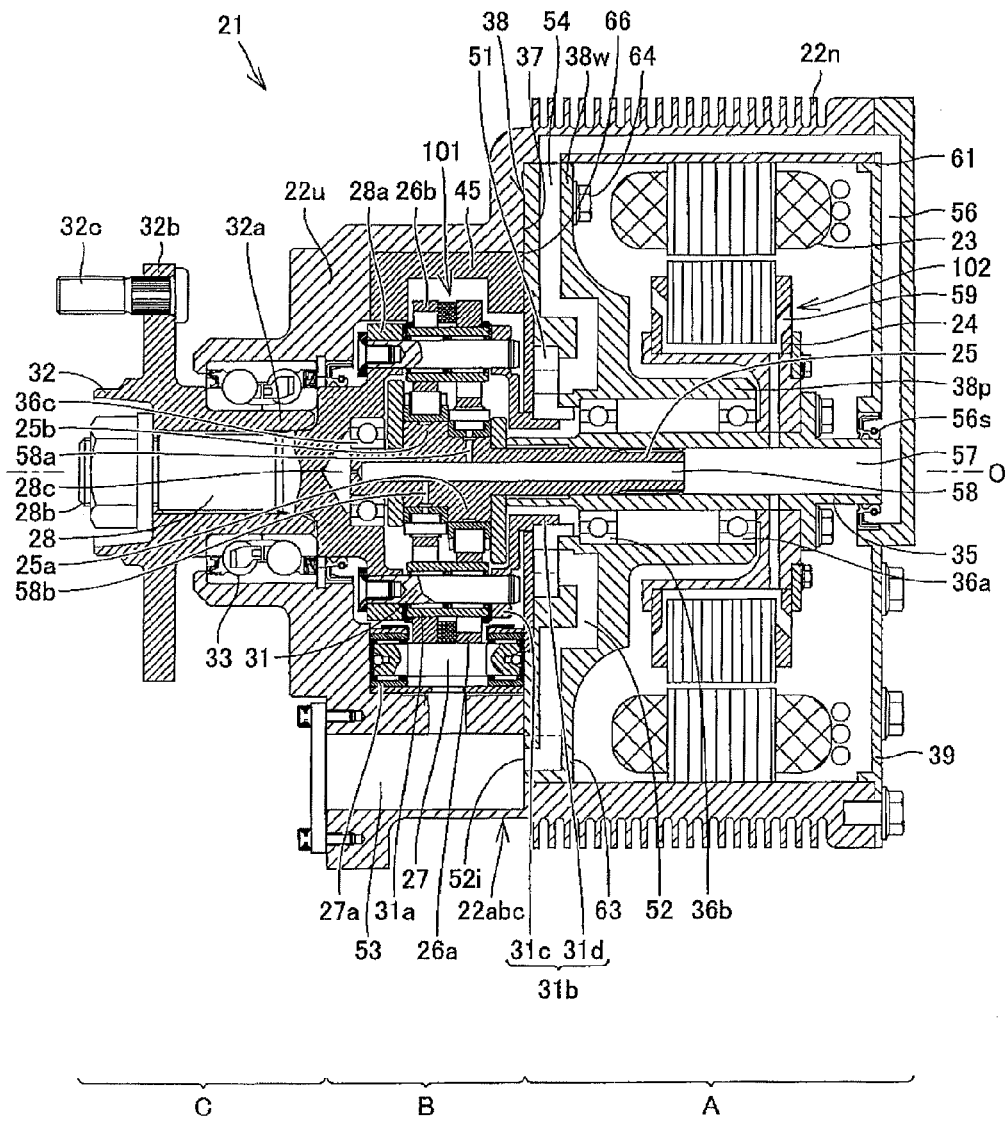
FIG. 9 is a vertical cross-sectional view of an in-wheel motor drive assembly according to yet another example of the present invention.

Next, an in-wheel motor drive assembly according to yet another example of the present invention will be described. FIG. 9 is a vertical cross-sectional view showing the example of the present invention. Through the example, components common with those in the above-described examples are marked with the same numerals as the examples and will not be further explained, but different components will be described below. In this example, the in-wheel motor drive assembly 21 includes an in-wheel motor common casing 22abc formed by integrally connecting an outer-ring-side member (a casing included in the wheel hub bearing unit C), which is disposed on one side along the axis O and provided to the outer circumferential surface of the wheel hub 32 to support the wheel hub bearing, a speed-reduction-unit casing (a casing included in the speed reduction unit B), which is disposed in the middle of the axis O and houses the speed reduction unit 101, and a motor-unit casing (a casing included in the motor unit A), which is disposed in the other side along the axis O, has an opening 61 and houses the motor rotary shaft 35.

For the air-cooled in-wheel motor drive assembly 21 according to the example, the speed reduction unit 101 and rotor unit 102 can be manufactured on different assembly lines as in the case of the example shown in FIG. 1. The above-described manufacturing method can reduce the assembling time with the multiple parallel assembly lines.

Furthermore, since the in-wheel motor drive assembly according to the example shown in FIG. 9 includes the in-wheel motor common casing 22abc formed by integrally connecting the outer-ring-side member, speed-reduction-unit casing and motor-unit casing, the step of fixedly coupling the outer-ring-side member (a casing included in the wheel hub bearing unit C), speed-reduction-unit casing and motor-unit casing can be eliminated from the assembly line, thereby improving operation efficiency. This also eliminates position tolerance control among the wheel hub bearing unit C, speed reduction unit B and motor unit A, and therefore facilitates attachment of the outer-pin holder 45 and stator 23 coaxially with the axis O.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The in-wheel motor drive assembly according to the present invention can be advantageously used in electric vehicles and hybrid vehicles.

REFERENCE SIGNS LIST

21: in-wheel motor drive assembly; 22a: motor-unit casing; 22c: outer-ring-side member; 22ab: motor-unit/speedreduction-unit common casing; 22bc: speed-reduction-unit/wheel-hub-bearing-unit common casing; 22abc: in-wheel motor common casing; 22n: fin; 23: stator; 24: rotor; 25: input shaft; 25a, 25b: eccentric member; 26a, 26b: curved plate; 27: outer pin; 28: output shaft; 28a: flange portion; 28b: shaft portion; 30a, 30b: through hole; 31: inner pin; 31b: reinforcing member; 32: wheel hub; 32a: hollow portion; 32b: flange portion; 33: wheel hub bearing; 35: motor rotary shaft; 36a, 36b, 36c: rolling bearing; 37: annular step; 38: partition wall; 38w: main wall portion; 38p: tubular portion; 39: rear cover; 41: rolling bearing; 45: outer-pin holder; 51: lubrication oil pump; 52: intake oil passage; 53: oil reservoir; 54: discharge oil passage; 55: casing oil passage; 56: communication oil passage; 57: motor-rotary-shaft oil passage; 58: speed-reduction-unit input-shaft oil passage; 58a, 58b: lubrication oil passage; 59: rotor oil passage; 61: opening; 62: cooling water passage; 63: cut-away portion; 66: opening.

The invention claimed is:

1. An in-wheel motor drive assembly comprising:
a wheel hub bearing unit including a tubular wheel hub, a cylindrical outer-ring-side member surrounding an outer circumferential surface of the wheel hub, and a wheel hub bearing provided in an annular space formed between the outer circumferential surface of the wheel hub and an inner circumferential surface of the outer-ring-side member and rotatably supporting the wheel hub; and
a speed reduction unit adopting a speed reduction mechanism having an output shaft extending in one direction and an input shaft extending in another direction to reduce rotational speed of the input shaft and transmit a reduced rotation to the output shaft,
a rotor unit having a tubular motor rotary shaft and a rotor secured to an outer circumferential surface of the motor rotary shaft;
a cylindrical casing; wherein the outer-ring-side member of the wheel hub bearing unit connects to a first axial end of the cylindrical casing,
the speed reduction unit is inserted from an opening formed on a second axial end of the cylindrical casing opposite to the first axial end and into an inner space of the cylindrical casing, and one end of the output shaft extending in one direction of the speed reduction unit is fixedly inserted in the wheel hub of the wheel hub bearing unit,
the rotor unit is inserted from the opening formed on the second axial end of the cylindrical casing into the inner space of the cylindrical casing, and one end of the motor rotary shaft is fixedly attached on the input shaft of the speed reduction unit, and wherein
the rotor unit, the speed reduction unit, and the wheel hub bearing unit are connected and assembled together.

2. The in-wheel motor drive assembly according to claim 1, wherein the rotor unit further includes:
a motor-rotary-shaft supporting member attached on one axial end of the motor rotary shaft and fixedly coupled with cylindrical casing and fixedly connected an inner circumferential surface of the cylindrical casing to rotatably support the motor rotary shaft.

3. The in-wheel motor drive assembly according to claim 2, wherein the motor-rotary-shaft supporting member includes:
a partition wall dividing the interior space of the cylindrical casing into an interior space for the speed reduction and an interior space for the rotor unit; and
rotor unit bearings provided in a center bore formed at a center of the partition wall and having an axial end of the motor rotary shaft passing therethrough to rotatably support the motor rotary shaft.

4. The in-wheel motor drive assembly according to claim 3, wherein the partition wall includes a tubular portion extending along an axis of the in-wheel motor drive assembly and forming the center bore and a main wall portion formed on an axial end of the tubular portion and secured to an inside of the cylindrical casing, and
the rotor unit bearings are disposed on the opposite ends of the tubular portion, respectively.

5. The in-wheel motor drive assembly according to claim 3, wherein the partition wall is provided with an oil pump driven by the speed reduction unit to discharge lubrication oil.

6. The in-wheel motor drive assembly according to claim 1, wherein the casing is a rotor-unit/speed-reduction-unit common casing which is a rotor-unit casing housing the rotor unit and a speed-reduction unit casing housing the speed reduction unit integrally connected each other,
and the outer-ring-side member of the wheel hub bearing unit and the motor-unit/speed-reduction-unit common casing are fixedly coupled with each other with a predetermined coupling member.

7. The in-wheel motor drive assembly according to claim 1, wherein the casing includes a rotor-unit casing housing the rotor unit and a speed-reduction unit casing housing the speed reduction unit,
the outer-ring-side member of the wheel hub bearing unit is integrally connected with the speed-reduction-unit casing to form a speed-reduction-unit/wheel-hub-bearing common casing, the speed-reduction-unit/wheel-hub-bearing common casing being disposed on one side along an axis of the in-wheel motor drive assembly,
the motor-unit casing is disposed on the other side along the axis, and
both of the casings are fixedly coupled with each other with a predetermined coupling member.

8. The in-wheel motor drive assembly according to claim 1, wherein the outer-ring-side member of the wheel hub bearing unit and the cylindrical casing are integrally connected to form an in-wheel-motor common casing.

9. The in-wheel motor drive assembly according to claim 1, further comprising a light alloy rear cover attached on an end of the cylindrical casing and shielding and protecting the interior space of the cylindrical casing from the outside.

10. The in-wheel motor drive assembly according to claim 1, wherein the speed reduction unit includes:
a disc-like eccentric member disposed on one end of the input shaft;
a revolution member attached to an outer circumferential surface of the eccentric member so as to rotate relative to the eccentric member and making orbital motion around a rotational axis of the input shaft;
a perimeter engagement member engaged with an outer circumferential surface of the revolution member to cause the revolution member to make axial rotation;
a perimeter-engagement-member holding member in the shape of a cylinder surrounding the outer circumferential surface of the revolution member, holding the perimeter engagement member, and fixedly coupled with the motor-unit casing forming the contour of the motor unit, the speed-reduction-unit casing housing the speed reduction unit, or the outer-ring-side member; and a motion conversion mechanism disposed across the output shaft and the revolution member and extracting axial rotation of the revolution member to transmit the axial rotation to the output shaft.

* * * * *